United States Patent [19]

Cowdery

[11] Patent Number: 4,575,109
[45] Date of Patent: Mar. 11, 1986

[54] LUGGAGE CASE WITH RETRACTABLE WHEELS

[76] Inventor: Timothy K. Cowdery, 13647 Oakwood Curve, Burnsville, Minn.

[21] Appl. No.: 470,620
[22] Filed: Feb. 28, 1983
[51] Int. Cl.⁴ .............................................. B62B 3/02
[52] U.S. Cl. .................................. 280/37; 190/18 A; 280/43.17
[58] Field of Search ............ 280/37, 641, 655, 43.17, 280/43.22, 47.21; 190/18 A; 248/129, 439

[56] References Cited

U.S. PATENT DOCUMENTS

| Re. 28,757 | 4/1976 | Cassimally | 280/37 |
|---|---|---|---|
| 726,618 | 4/1903 | Baruch | 190/18 A |
| 1,404,368 | 1/1922 | Hastey | 190/18 A |
| 2,439,992 | 4/1948 | Simonian | 280/37 |
| 2,472,491 | 6/1949 | Quinton | 280/37 |
| 2,510,754 | 6/1950 | Norlin | 280/38 |
| 2,577,951 | 12/1951 | Cortsen | 280/37 |
| 2,604,959 | 7/1952 | Arbib | 190/11 |
| 2,760,782 | 8/1956 | Hartzell | 280/37 |
| 3,141,680 | 7/1964 | McCord et al. | 280/38 |
| 4,066,156 | 1/1978 | Basile | 190/18 A |
| 4,087,102 | 5/1978 | Sprague | 280/37 |
| 4,273,222 | 6/1981 | Cassimally et al. | 280/37 X |
| 4,314,624 | 2/1982 | Royet | 190/18 A |

FOREIGN PATENT DOCUMENTS 354482  6/1922  Fed. Rep. of Germany ........ 280/37

Primary Examiner—John A. Pekar
Assistant Examiner—Michael Mar
Attorney, Agent, or Firm—Dorsey & Whitney

[57] ABSTRACT

A luggage case having a retractable handle and retractable wheels which includes a clothes bar for hanging clothes and other items as well as inner compartments, at least one of which is accessible without opening the luggage case. The case is made up of a top portion and a bottom portion which are pivotally connected to each other so that they have an open and a closed position. When in the closed position the top and bottom portions form a case having top and bottom walls, front and rear walls and a pair of side walls. The retractable handle and retractable wheels can be linked so that extension of the retracted handle causes extension of the retracted wheels.

7 Claims, 7 Drawing Figures

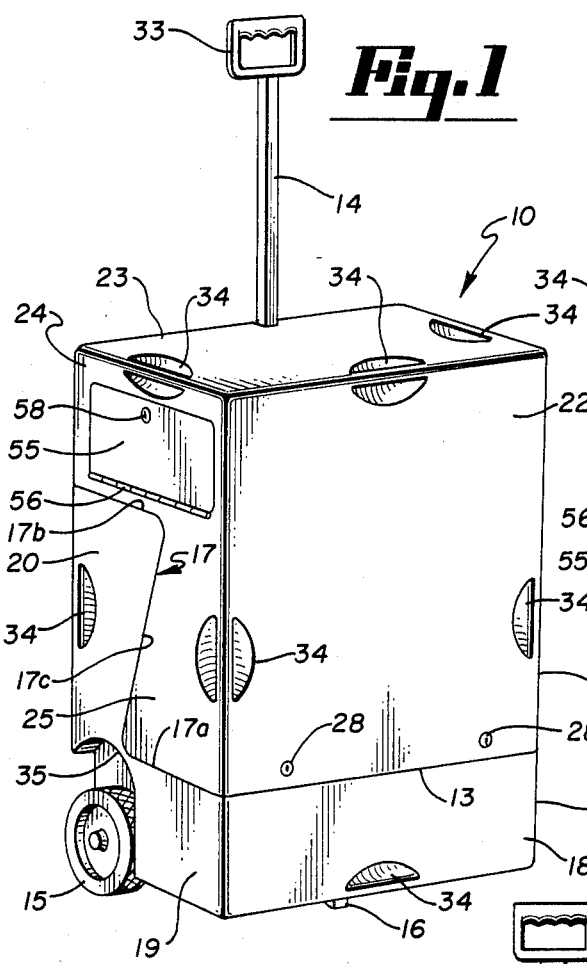
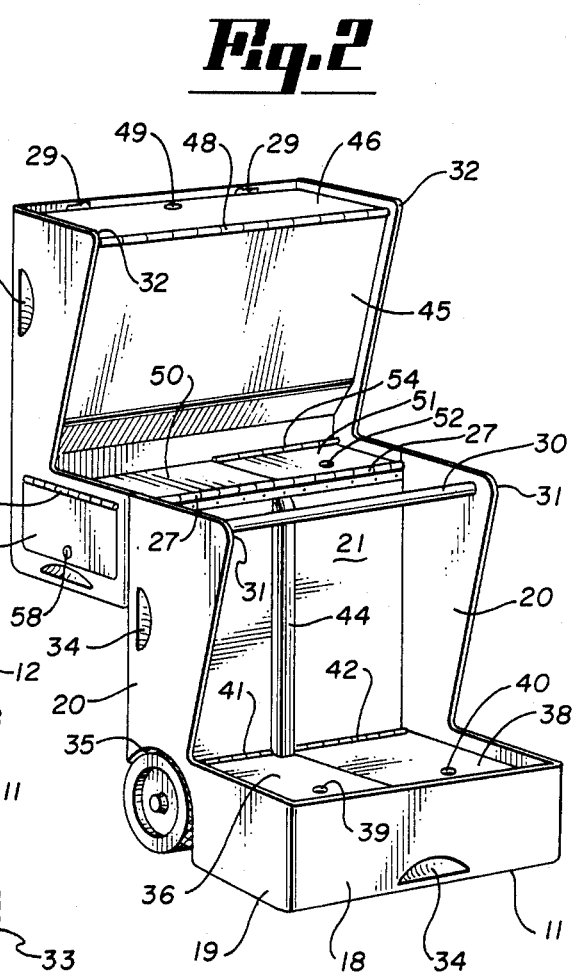
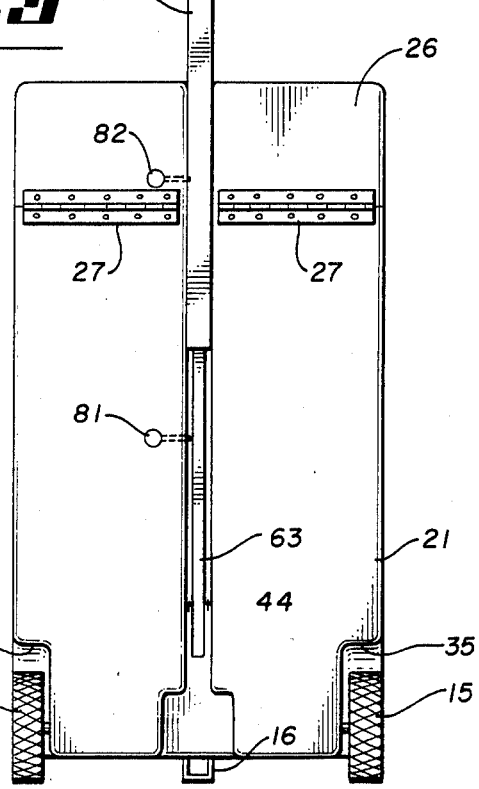
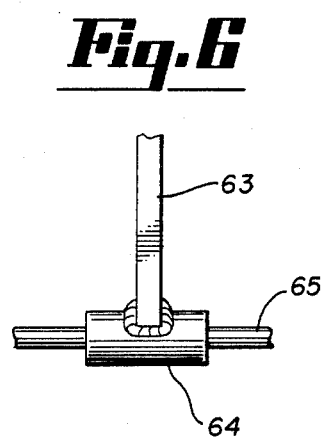

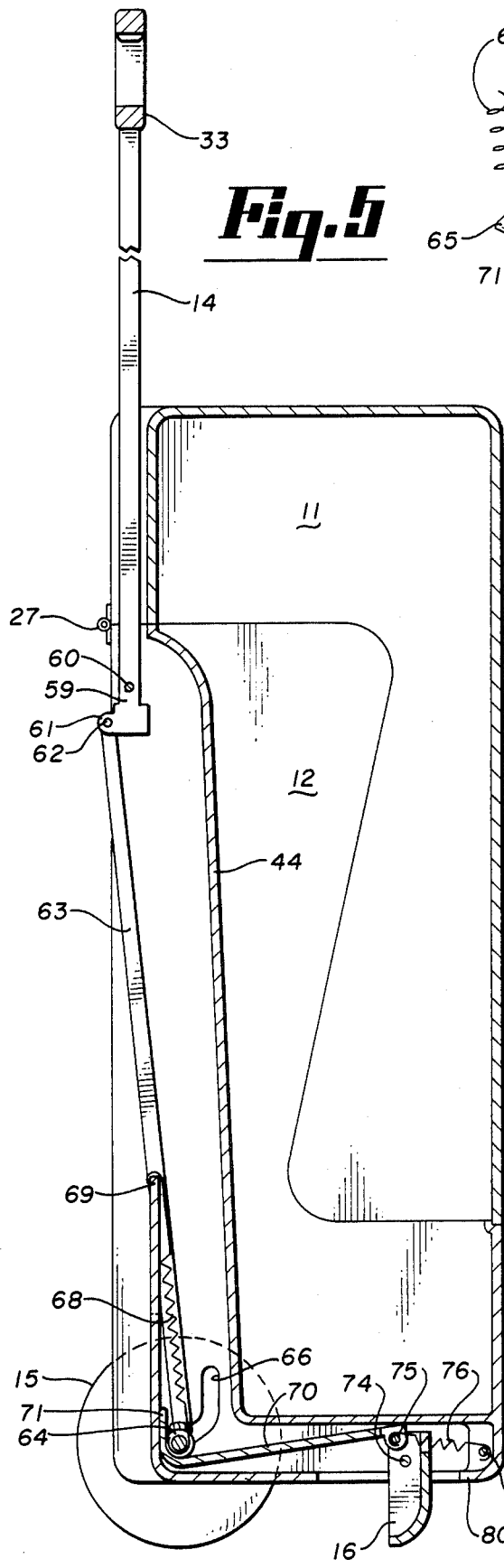
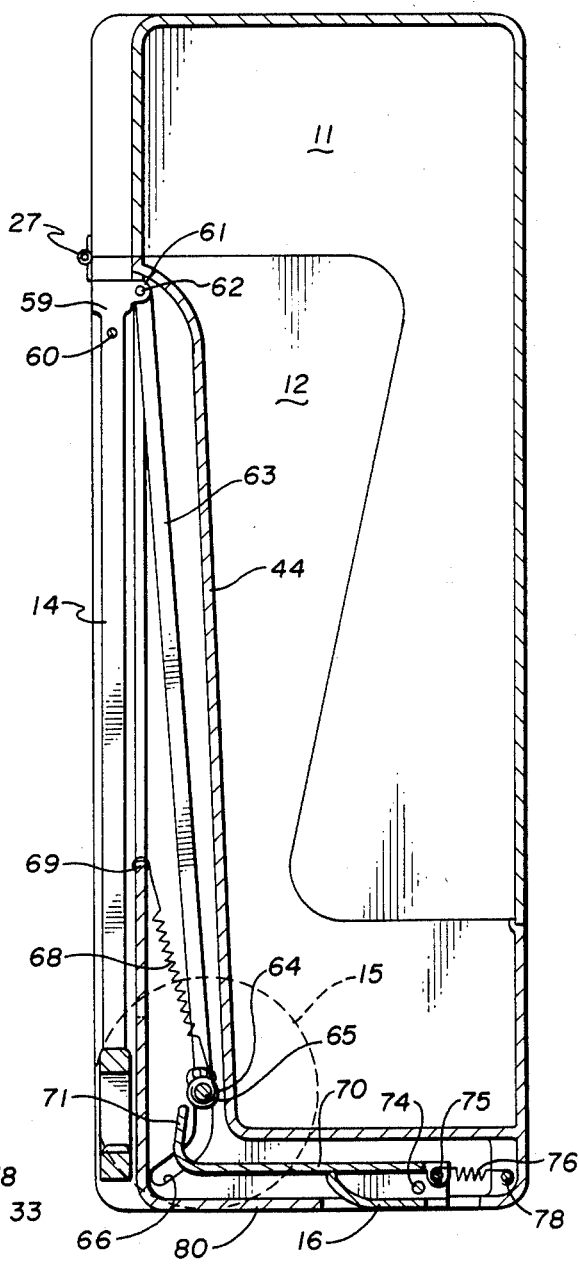

LUGGAGE CASE WITH RETRACTABLE WHEELS

BACKGROUND OF THE INVENTION

The present invention relates generally to a luggage case, and more particularly, to a luggage case with a retractable handle and wheels and a luggage case which is uniquely constructed to provide efficiency in packing and in gaining access to items within the case.

There are a great number of suitcase or luggage case products of all different sizes and shapes presently available. These are used primarily for transporting clothing and other personal items during travel. Many of these are smaller cases which can be easily handled and carried without assistance from redcaps at the airports or bellboys at the hotels. Because of their size, however, the amount of space available for the packing of clothes and the like is quite limited. Further, most of these smaller cases are of conventional construction having a bottom half into which the clothes or other personal items are packed and a top half or cover which is simply closed over the items when the packing is complete. As a result, access to any particular item in the case usually involves rummaging through the entire contents of the suitcase until the desired item is located.

The larger suitcases and luggage cases, particularly when fully packed, are quite heavy and usually require the assistance of a redcap or bellboy or a wheeled cart or mechanism to move these larger cases from one location to another. Some of the larger luggage cases presently existing in the prior art have incorporated retractable wheels within the luggage itself. For example, U.S. Pat. No. 2,510,754 granted to Norlin, U.S. Pat. No. 3,141,680 granted to McCord et al. and U.S. Pat. No. 4,314,624 granted to Royet all disclose luggage cases with a retractable handle and retractable wheels. While these prior art structures have been generally satisfactory in some applications, the mechanisms tend to be quite complicated and lack the stability and sturdiness desired in a large luggage case. Further, each of these luggage case structures incorporates a conventional case design having a bottom portion and a hinged cover. In these conventional cases, clothes or other personal items are first laid or packed into the bottom portion after which the cover is then closed. Such construction makes access to a particular item within the case virtually impossible, in some cases, without unpacking the entire contents. Still further, the only access to these prior art luggage cases is by opening the entire case in the conventional manner.

Accordingly, there is a need in the art for a luggage case, regardless of size, with a retractable handle and retractable wheels which is sturdy and of relatively simple construction and which has a case construction which permits easy access to the clothes or other items packed into the case while still providing efficiency of storage.

SUMMARY OF THE INVENTION

The present invention provides an improved luggage case having a retractable handle and retractable wheels and which overcomes many of the deficiencies presently existing in the prior art. More specifically, the luggage case construction of the present invention has a unique construction which provides for at least five separate compartments for the packing of clothes or other personal items and in addition includes a clothes bar over which pants, jackets and other similar clothes items can be draped. The case of the present invention also provides access to at least one of the inner compartments of the case without opening the entire luggage case. Further, the construction is such that the clothes bar is approximately centered within the case so that clothes can be actually hung on the bar while the case is in its normal upright position. The case also includes a construction in which each of the various compartments of the interior of the case are all readily accessible when the case is in its open position.

The luggage case of the present invention also includes a pair of retractable wheels and a retractable handle which is pivotable between a retracted, non-operative position to an extended, operative position. Movement of the handle between its retracted and extended positions moves the wheels between their corresponding retracted and extended positions. The mechanism for accomplishing the above extension and retraction includes a cam or motion transfer link associated with one end of the handle so that as the handle is pivotally moved from the retracted to an extended position, the wheels are moved in a similar fashion. The mechanism also includes a support leg member which is extended and retracted in conjunction with the wheel movement so that when the wheels are extended and in an operable position, the leg member is also in an extended position, thus permitting the case to be supported in a fully upright position.

Accordingly, it is an object of the present invention to provide a luggage case having a retractable handle and retractable wheels.

Another object of the present invention is to provide a luggage case in which the wheels are movable between a retracted, non-operative position and an extended, operative position as a result of pivotal movement of the handle between its retracted and extended positions.

A further object of the present invention is to provide an improved luggage case construction providing ready access to the clothes or other personal items packed in the case.

Another object of the present invention is to provide an improved luggage case construction having several different compartments within the case which are all readily accessible when the case is opened and which also provides for efficiency in packing.

Another object of the present invention is to provide an improved luggage case having a plurality of handles so that a handle is available for moving the case, regardless of its position.

A further object of the present invention is to provide an improved luggage case with a generally centrally positioned clothes bar for adding rigidity to the case.

These and other objects of the present invention will become apparent with reference to the drawings, the description of the preferred embodiment and the appended claims.

DESCRIPTION OF THE DRAWINGS

FIG. 1 is a pictorial view of the luggage case of the present invention with the case being closed and the wheels and handle is in an extended, operative position.

FIG. 2 is a pictorial view of the luggage case of the present invention with the wheels and handle in a retracted, non-operative position and the case being opened and showing access to the various compartments within the case.

FIG. 3 is an elevated rear view of the luggage case of the present invention with the handle and the wheels in an extended, operative position.

FIG. 4 is a side view, partially in section, with the handle, the wheels and the support leg in their retracted, non-operative positions.

FIG. 5 is a side view, partially in section, similar to FIG. 4 with the handle, the wheels and the support leg in their extended, operative positions.

FIG. 6 is an elevational view showing the connection between the force transfer rod associated with the pivotable handle and the wheel axle.

FIG. 7 is a pictorial view showing the mechanism for retracting and extending the support leg in conjunction with the wheel movement.

DESCRIPTION OF THE PREFERRED EMBODIMENT

With reference to FIGS. 1, 2 and 3, the luggage case 10 of the present invention is shown as including a bottom or base portion 11, a top or cover portion 12 which is pivotally connected with the base portion 11, a retractable handle 14, a pair of retractable wheels 15, 15 and a retractable support leg 16. As illustrated in FIG. 1, the luggage case 10 has a generally rectangular configuration when the top portion 12 is closed although other configurations and shapes could be utilized as well. Also, in the preferred embodiment, the largest dimension of the generally rectangular configuration is positioned vertically so that the luggage case is generally supported on its end rather than on its back portion as is conventional in the prior art.

The bottom or base portion 11 includes a forward wall 18, a pair of side walls each comprising a side wall portion 19 and a side wall portion 20, a back or rear wall 21 and a bottom wall (not shown). As illustrated, the front wall 18 and the side wall portions 19, 19 are relatively short compared to the overall height of the luggage case 10. The side wall portions 20, 20 extend upwardly from the side wall portion 19, 19. In the preferred embodiment, the side wall portions 20, 20 extend upwardly and toward the front of the luggage case toward a forwardly extending edge 31, 31 (FIG. 2) which is disposed forwardly of the center of the luggage case. The back or rear wall 21 is illustrated best in FIG. 3.

The top portion 12 of the luggage case 10 includes a forward wall portion 22, a pair of side walls each comprising a side wall portion 24 and a side wall portion 25, a top wall 23 and a rear wall 26. When the luggage case is closed as illustrated in FIG. 1, the front wall 22 forms a portion of the front surface of the case with its lower edge adapted for engagement with the upper edge of the forward wall 18 of the base portion 11. The side wall portions 24, 24 and 25, 25 forming each of the side walls of the top portion 12 include an edge which conforms substantially to the corresponding edge of the side wall portions 19, 19 and 20, 20 of the side walls in the base portion 11. In this respect it should be noted that the corresponding edges of the forward walls 18 and 22 and the side wall portions 19, 19, 20, 20 and 24, 24, 25, 25 are adapted for overlapping engagement with each other as is conventional in the art. The top wall 23 joins the forward wall 22 and the side wall portion 24 of each of the side walls as well as the rearward and back wall 26. As illustrated in FIGS. 2 and 3, the lower edge of the back wall 26 is hinged to the top edge of the back wall 21 by a pair of conventional strap hinges 27, 27. In the preferred embodiment, each of the side wall portions 25 include a portion 32, 32 which extends rearwardly of the center of the luggage case when the same is in its closed position as illustrated in FIG. 1. Also, the top and bottom portions 11 and 12 are hinged about an axis which is generally parallel to both the rear wall and the bottom wall of the case.

When the luggage case 10 is in its closed position as illustrated in FIG. 1, the resulting luggage case structure includes a top wall 23, a bottom wall, a front wall defined by the wall sections 18 and 22, a back wall defined by the wall sections 21 and 26 and a pair of side walls each defined by the wall sections 19, 20, 24 and 25. As shown, the hinges 27, 27 (FIG. 3) are spaced below the top wall 23. This provides space for separate compartments in the top portion as describd below. The top and bottom portions 11 and 12 join each other along a first seam 13 on the front wall and along a second seam 17 on each of the side walls. The first seam 13 is generally parallel to the axis of the hinges 27, 27, while the second seam 17 is formed of several sections. In the preferred embodiment, the second seam 17 is comprised of first and second seam sections 17a and 17b extending generally perpendicular to the front and rear walls of the case, respectively, and a third seam section 17c joining and extending between the seam sections 17a and 17b.

As illustrated in each of FIGS. 1, 2 and 3, both the bottom portion 11 and the top portion 12 include a plurality of handles 34 positioned in various points along the periphery of the luggage case to facilitate ease of handling and moving the case when the same is desired. These handles 34 can be molded directly into the case itself or can be leather straps connected with the exterior of the case or any other handle known in the art. In the preferred embodiment, as shown in FIGS. 1 and 2, the top portion 12 is secured and locked with the base portion 11 by a pair of standard cylinder locks 28, 28 (FIG. 1). Each of these locks 28, 28 includes a latching mechanism 29, 29 (FIG. 2) disposed on the interior lower edge of the front wall 22 and are adapted to engage a corresponding latching mechanism (not shown) disposed in the upper edge of the front wall 18 of the bottom portion 11 in a conventional manner.

With specific reference to FIG. 2, the base portion 11 is shown as including a pair of compartments for the packing of clothes or other personal items. These compartments include covers 36 and 38 which are hinged to a portion of the back wall 21 by a pair of conventional hinges 41, 42, respectively. Conventional spring latches 39, 40, respectively, are also associated with the covers 36 and 38 to secure the same in a closed position when desired. A hollow rib portion 44 which, on the reverse side, houses the retractable handle 14 is provided on the interior surface of the back wall 21 of the base portion 11. The base portion 11 is also provided with a recessed wheel well 35 at each of its lower, rearward corners to permit retraction of the wheels 15, 15 when in their retracted, non-operative position and to also prevent the wheels from extending outwardly of the side walls of the case. Disposed between the upper and forwardly disposed sections of the side wall portions 20, 20 is a clothes bar 30. As ilustrated in FIG. 2, the clothes bar 30 is disposed approximately in the center of the luggage case between the front and back. This provides stability when the luggage case is being loaded. The existence of the clothes bar 30 also provides additional rigidity to the case structure itself. In the preferred embodiment, the clothes bar 30 is fixedly secured at its opposite ends to the inner surfaces of the upper forward portions of side walls 20, 20.

As illustrated in FIG. 2, the upper or top portion 12 of the luggage case is hinged to the upper edge of the back wall 21 by the strap hinges 27, 27 and when opened exposes three additional compartments for packing of clothes or other personal items. One compartment 45 is disposed between the side wall portions 25, 25 and includes a cover 46 which is connected with a forward wall of the compartment 45 by the hinge 48. The cover 46 includes a conventional spring latch 49 to secure the cover 46 in a latched position when desired. A second compartment is formed adjacent one of the side wall portions 24 and includes a cover 51 which is pivotally connected to an interior portion of the front wall 22 by the hinge 54. A conventional spring latch 52 is associated with the cover 51 to permit it to be secured in a closed position when desired. The third compartment 50 in the top portion 12 is not accessed from the interior of the case, but rather is provided with access from the exterior of the case through the cover 55 which is hinged to the side wall portion 24 by the hinge 56. A conventional key cylinder lock 58 similar to the cylinder locks 28, 28 (FIG. 1) is associated with the cover to permit the compartment 50 to be locked.

The mechanism for extending and retracting the handle 14, the pair of wheels 15, 15 and the support leg 16 is illustrated best in FIGS. 4 and 5. FIG. 4 is a view showing the handle 14, wheels 15, 15 and support leg 16 in a retracted, non-operative position, while FIG. 5 shows the same elements in an extended, operative position. As shown in these figures, the retractable handle 14 is connected at one end to a cam element or motion transfer link 59 which is pivotally secured to the body of the luggage case via the pivot point 60. The other end of the handle includes a gripping portion 33. One end of the link 59 is securely connected with the handle 14 while the other end includes an extending ear portion 61 which is pivotally secured to a wheel actuator rod 63 about the pivot 62. The other end of the wheel actuator rod 63 is connected near the center point of a wheel axle 65. The connection between the lower end of the wheel actuator rod 63 and the wheel axle 65 is illustrated best in FIG. 6 in which the lower end of the wheel actuator rod 63 is shown as being welded or otherwise secured to a short tubular bushing 64 through which the axle 65 extends. A pair of springs 68 are disposed between the wheel axle 65 and a portion of the case to exert a force on the axle tending to move the same toward a retracted position.

Opposite ends of the axle 65 extend through guide slots 66 which serve as guide means within each of the wheel wells 35 (FIGS. 1-3). The guide slots 66 can be molded directly into the body of the luggage case with or without reinforcement or can be formed separate from and then connected to the case. Each of the guide slots 66, as best illustrated in FIGS. 4 and 5, includes a short vertical section and a section which is angled downwardly and toward the rear of the case. The wheel axle 65 extends through these slots at each side end of the case and is guided by the slots 66 during movement of the wheels between retracted and extended positions. The wheels 15, 15 are mounted on the ends of the axle 65.

FIGS. 4 and 5 also illustrate the mechanism for extending and retracting a support leg 26. This mechanism includes an elongated support leg actuator rod 70 which is pivotally secured at one end to an upper portion of the support leg 16 at the pivot point 75 and includes a hook portion 71 at its opposite end. As shown, the hook portion 71 extends across the path of the guide slot 66 so that as the axle 65 is moved downwardly and outwardly along the path of the guide slot 66, the hook portion 71 is engaged and carried along with it. A spring member 76 is positioned between the pivot point 75 of the upper edge of the support leg 16 and a portion of the luggage case. This exerts a force tending to pivot the leg 16 toward a retracted position. Thus, as the wheel axle 65 is moved upwardly along the path of the slot 66, the spring 76 will pivot the leg 16 into a retracted position.

FIG. 7 is a pictorial view showing the manner in which the support leg 16 is retracted and extended. As shown, the leg 16 is pivotally supported with respect to the bottom portion 80 of the luggage case about the pivot axis 74. This axis is in turn supported by a pair of upstanding ear members 79, 79. The leg axis 74 extends through the ears 79, 79 and through a portion of the leg 16 to pivotally support the same with respect to the luggage case. The spring 76 is connected at its other end 78 to a portion of the luggage case.

The operation of the retractable handle, wheel and leg mechanism of the present invention can be understood best with reference to FIGS. 4 and 5. When in a retracted or non-operative position, the handle 14 is disposed within the groove or channel 44 in the back side of the luggage case (FIG. 3). In this position the wheels 15, 15 are retracted within the wheel wells 35 in the position illustrated in FIG. 4. The wheels are biased toward this retracted position via the spring member 68. The support leg 16 is also in a retracted position as illustrated in FIG. 4. It should be noted that when the handle is in a retracted position, a spring loaded pin or other detent mechanism retains the handle 14 in its retracted position. In the preferred embodiment, the handle can be snapped into this retracted position merely by the exertion of sufficient force, but a release button 81 must be depressed in order to release the handle 14 from its retracted position. To extend the wheels 15, 15 and the support leg 16, the handle 14 is pivoted upwardly and outwardly in a clockwise direction as illustrated in FIGS. 4 and 5. As the handle 14 is pivoted in this manner, the rotation of the motion transfer link 59 about the pivot 60 causes the wheel actuator rod 63 to move the wheel axle 65, and thus the wheels 15, 15 downwardly along the path defined by the guide slot 66. As the axle 65 reaches a point of engagement with the hook portion 71 of the rod 70, the rod 70 is moved as well, thereby pivoting the support leg 16 downwardly with respect to the pivot 74. When the handle 14 reaches its fully extended or operative position as illustrated in FIG. 5, the wheels 15, 15 and the support leg 16 assume their fully extended positions illustrated in FIG. 5. When the handle is in its extended position, it is retained in that position by an appropriate spring loaded pin or detent member which engages the handle 14 in a conventional manner to retain the handle in its extended position. Similar to the latch mechanism which retains the handle in a retracted position, this latch mechanism will permit the handle to be forced into latching engagement simply by exerting sufficient force. However, depression of the spring loaded button 82 is necessary to release the handle from its extended position. To retract the handle 14, the wheels 15, 15 and the support leg 16, the above procedure is reversed.

Although the description of the preferred embodiment has been quite specific, it is contemplated that various changes and modifications could be made to the described structure without deviating from the spirit of the present invention. Accordingly, it is intended that the scope of the present invention be dictated by the claims rather than by the description of the preferred embodiment.

I claim:

1. A luggage case having a front wall, a back wall and a plurality of edge walls, said luggage case comprising:
    an elongated handle pivotally secured to said back wall of the luggage case about a first axis and pivotally movable through an arc of approximately 180° between a retracted, non-operative position in which said handle is generally parallel to said back wall and an extended, operative position in which said handle is generally parallel to said back wall and disposed at approximately 180° relative to the position of said handle when said handle is in its non-operative position, said handle including a gripping portion near one end and a motion transfer link at its other end on the side of said first axis opposite said gripping portion;
    an elongated wheel axle extending parallel to said first axis and supporting a pair of wheels, said wheel axle and said wheels being movable between a retracted, non-operative position and an extended, operative position;
    a pair of guide means comprising an elongated guide slot near each end of said wheel axle for guiding the movement of said wheel axle between its retracted and extended positions;
    an enlongated recess extending along a portion of said back wall and being generally perpendicular to said wheel axle; and
    an elongated motion transfer rod located within said elongated recess extending between said motion transfer link and said wheel axle for causing movement of said wheel axle along said elongated guide slots between retracted and extended positions of said wheel axles in response to corresponding movement of said handle between its retracted and extended positions.

2. The luggage case of claim 1 wherein said recess houses said handle when in a retracted position.

3. The luggage case of claim 1 including spring means biasing said axle toward its retracted position.

4. The luggage case of claim 1 including a retractable support leg pivotally connected to the bottom of said luggage case and movable between a retracted and an extended position.

5. The luggage case of claim 4 including a support leg actuator rod having one end connected with said support leg and its other end in position for engagement by said axle.

6. The luggage case of claim 5 including means for transferring movement of said axle to said actuator rod so that said support leg is retracted and extended in response to extension and retraction of said axle.

7. The luggage case of claim 1 wherein said guide slots are shaped so as to result in movement of said wheels between a retracted position in which said wheels are disposed entirely within the periphery of said luggage case and an extended position in which a portion of said wheels are disposed below and to the rear of said luggage case.

* * * * *